United States Patent [19]

Fujita et al.

[11] Patent Number: 4,952,918

[45] Date of Patent: Aug. 28, 1990

[54] DISPLAY AND INPUT APPARATUS

[75] Inventors: Shigeru Fujita; Hideo Tanaka; Susumu Harada, all of Numazu, Japan

[73] Assignee: Toshiba Kikai Kabushiki Kaisha, Tokyo, Japan

[21] Appl. No.: 191,967

[22] Filed: May 9, 1988

[30] Foreign Application Priority Data

May 11, 1987 [JP] Japan .................................. 62-113846
May 11, 1987 [JP] Japan .................................. 62-113848
May 11, 1987 [JP] Japan .................................. 62-113849

[51] Int. Cl.$^5$ .............................................. G09G 1/08
[52] U.S. Cl. ..................................... 340/706; 340/712
[58] Field of Search .................. 340/706, 712; 178/18, 178/19; 341/33, 34; 200/5 A

[56] References Cited

U.S. PATENT DOCUMENTS

| | | | |
|---|---|---|---|
| 4,204,204 | 5/1980 | Pitstick | 340/712 |
| 4,413,314 | 11/1983 | Slater et al. | 340/712 |
| 4,421,418 | 12/1983 | Morishima | 340/712 |
| 4,479,197 | 12/1984 | Haag et al. | 340/712 |
| 4,495,651 | 1/1985 | Froeliger | 340/712 |
| 4,711,560 | 12/1987 | Hosaka et al. | 355/200 |
| 4,796,019 | 1/1989 | Auerbach | 340/712 |

Primary Examiner—Alvin Oberley
Assistant Examiner—M. Fatahiyar
Attorney, Agent, or Firm—Cushman, Darby & Cushman

[57] ABSTRACT

In a display apparatus comprising a display member in the form of a cathode ray tube adapted to display a plurality of set items and a transparent touch panel superposed on the display member and formed with a plurality of touch key elements, there are provided at least one increment key and at least one decrement key located near a plurality of juxtaposed input data display members.

9 Claims, 7 Drawing Sheets

DISPLAY AND INPUT APPARATUS

BACKGROUND OF THE INVENTION

1. Field of the Invention

This invention relates to an input display apparatus comprising a display means such as a cathode ray tube (CRT) or the like, and a transparent touch panel superposed on the display means and provided with touch key elements.

2. Description of the Prior Art

Although the input display apparatus of this invention can be used for other applications, it is most suitable for an injection molding machine for molding products having a relatively large thickness, precise dimensions and a small internal strain such as optical lenses. The invention will be described as applied to such an injection molding machine.

A copending U.S. patent application Ser. No. 140,145, filed on Dec. 29, 1987 discloses a method and apparatus for injection compression molding of the type described above.

The apparatus for operating an injection compression molding machine described in the U.S. patent application comprises a stationary metal mold, a movable metal mold, an oil pressure actuator for advancing the movable metal mold toward the stationary metal mold to form a mold cavity therebetween with a predetermined compression clearance $\delta$ between the movable and stationary metal molds, a heating cylinder engaging the stationary metal mold, means for supplying a thermoplastic resin into the heating cylinder, a screw contained in the heating cylinder for injecting molten resin into the mold cavity, means for rotating the screws, means for reciprocating the screw in the heating cylinder, a screw position detector for detecting an axial position of the screw, a plurality of screw position setters respectively setting predetermined screw positions along which the screw is moved, a plurality of comparators respectively comparing output signals of the screw position setters with the output signal of the screw position detector, a plurality of mold clamping force setters connected to receive output signals of respective comparators, a transfer switch for selecting one of the output signals of the mold clamping force setters, and an electromagnetic transfer valve energized by an output signal of the transfer switch through a control device for actuating the oil pressure actuator. There is also provided a timer for setting the rotation time of the screw, which determines the filling time of the molten resin.

The injection compression molding machine described above operates as follows. When the filling step is completed, the screw reaches the forward limit position. Then the metal molds are opened by moving the movable metal mold to take out the molded product. After that, metal molds are partially closed while leaving a predetermined compression clearance $\delta$ therebetween. For preparing the next filling step, the molten resin is stored in the heating cylinder in front of the screw by rotating the same. Then the screw is retracted by the cylinder while being rotated by the oil pressure motor. When the screw position detector detects a predetermined screw position, a signal is issued so that the electromagnetic transfer valve is moved to a position to block the pressurized oil discharged from the injection cylinder. Consequently, the screw continues to rotate at that predetermined position, whereby the molten resin is accumulated in the space in front of the screw for an interval set by the timer. After lapse of a time set by the timer, the electromagnetic transfer valve is brought to a position for advancing the screw by the injection cylinder so as to inject the molten resin accumulated in the space in front of the screw into the mold cavity under a high pressure. As the screw reaches a predetermined position, for example a position set by the screw position setter, and during the injection stroke, the mold clamping cylinder is actuated to clamp together the stationary and movable metal molds so as to decrease the clearance $\delta$. Consequently, the problem of insufficient quantity of the injected resin at each shot and the problem of creating internal stress can be solved.

Figure 3:
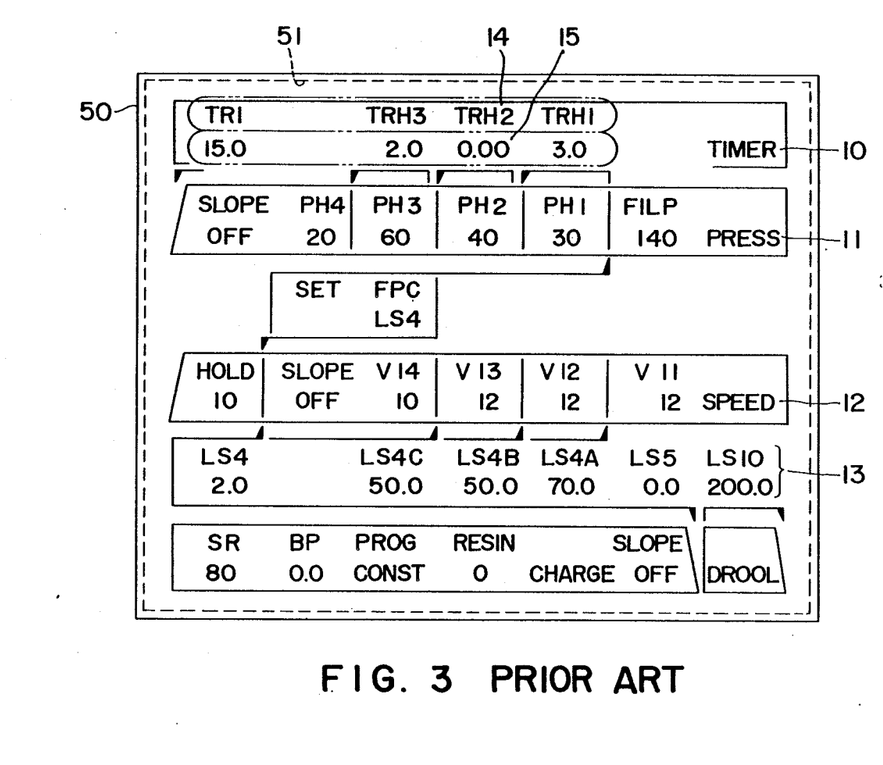
FIGS. 3 and 4 are block diagrams showing plan views of prior art display apparatus.
Figure 4:
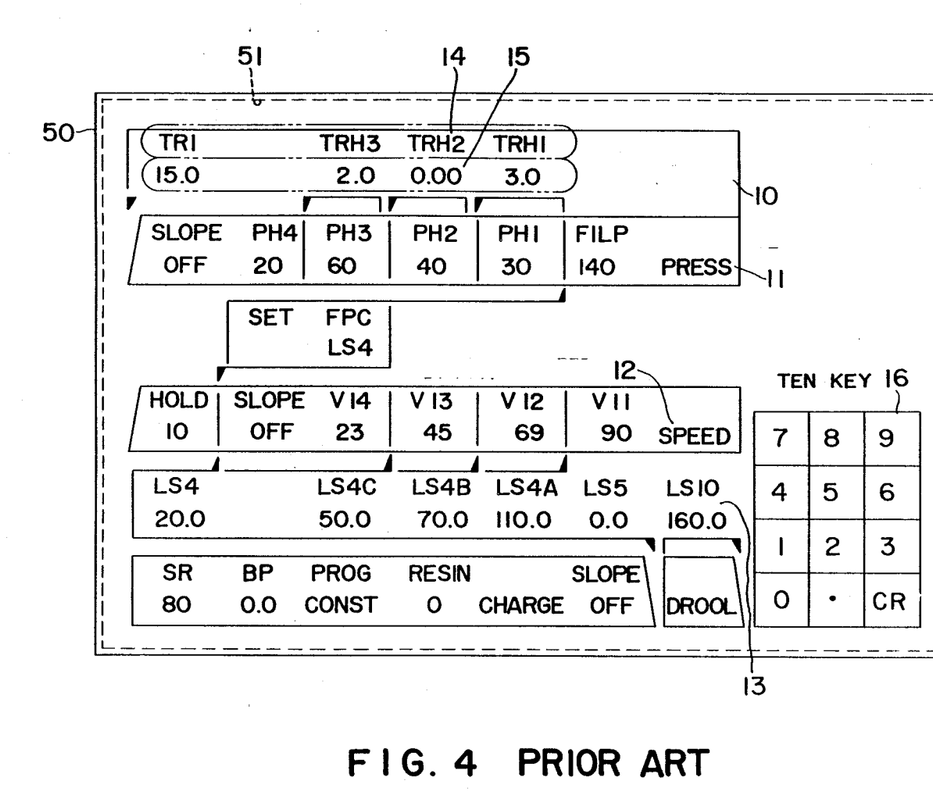

In an injection molding apparatus, and especially in the described injection compression molding apparatus, it is advantageous to provide a transparent touch panel superposed on the display member and provided with a plurality of touch key elements. A prior art input display device utilizing touch keys, as shown in FIGS. 3 and 4, comprises a touch panel 50 including a timer display setting member 10, an injection filling pressure display setter 11, an injection speed display setter 12, an injection speed changing position display setter 13, and other items. These are all labels for numerical machine parameters which can be changed by the display device, and shall hereafter be called set display labels. The corresponding displayed parameter number shall be referred to as a set data item. The transparent touch panel 50 is superposed on the face plate 51 of a CRT. The timer display setting portion 10 includes a plurality of timer setting means 14 including pressure holding timers TR1, TRH3, TRH2 and TRH1 which marked by set display labels, and a plurality of set display items 15 (in this case 15.0 sec., 2.0 sec., 0.00 sec. and 3.0 sec. respectively representing the times of timers TR1 . . . TRH1). The injection filling pressure portion 11 of the CRT depicts a SLOPE of a holding pressure, pressures held PH4, PH3, PH2, PH1 and final pressure FILP and their values in percentages 20, 60 and 40 of their maximum values. The final pressure FILP is set as 140% because such high pressure is necessary to inject the resin into an intricated mold cavity. Arrows between the blocks show related timer times and corresponding pressures to be held. The injection speed display portion 12 includes pressure HOLD, SLOPE, positions V14, V13, V12, V11 representing the positions at which the injection speed is changed and speeds in % of the maximum speed at respective positions. The injection speed changing portion 13 includes screw position detection limit switches LS4, LS4C, LS4B, LS4A, LS5, LS10, and strokes 2.0–0.0 and 200.0 each in mm in which 200.0 indicates the retracted position of the screw. The bottom portion of the CRT includes the numbers of screw revolutions SR, screw back pressure BP, metering control condition program PROG, RESIN (raw material code), SLOPE, their values 80, etc., quantity of charge CHARGE, OFF and DROOL which occurs when the nozzle is slightly separated from the stationary metal mold. It should be understood that most of these set display labels displayed on the CRT, correspond to a touch key, and that when these touch keys are depressed, the machine parameter corresponding to the selected set display label can be inputted or changed by a ten key 16, as shown in FIG. 4. The ten key 16 is located in the area of face plate 51 of the CRT. In this manner, by selectively operating the desired touch keys, the result of the operation can be observed on the face plate.

Where the ten key is remote from the CRT, as shown in FIG. 3, the set data displays 15 and the ten-key are separated and the setting operation becomes more difficult. If the ten key is included in a portion of the transparent touch panel, as shown in FIG. 4, only the area of the CRT excluding the ten key can be used as the data display area. As a consequence, where it is desired to display all related data on the same display apparatus the number of displayed input data items would be limited. Furthermore, where a ten key is used to input the data, it is necessary to input every digit. This is true even when an operator desires to change only one digit of an input data item. For example, when it is desired to change a setting of 201.5 to 211.5, the values of all the digits must be inputted. This is both troublesome and time consuming.

SUMMARY OF THE INVENTION

Accordingly, it is an object of this invention to provide an improved input display apparatus utilizing touch key elements capable of directly and digitally changing set data items or digits by operating an increment key and a decrement key provided for each digit of each data item appearing on the transparent touch panel.

Another object of this invention is to provide a novel input display apparatus capable of directly changing the set data with a digital switch system by superposing an input setting key frame on the face plate of a CRT at a position on the CRT which does not interfere with the set data item selected to be changed.

Still another object of this invention is to provide an improved input display apparatus utilizing touch switch elements capable of directly changing the set digits of data items via a digital switch system. The display apparatus includes an input setting key frame located in a portion of the face plate of the CRT which is not used for displaying the particular data items to be set.

According to this invention, these and further objects can be accomplished by providing input display apparatus comprising display means adapted to display a plurality of set data items and set display labels corresponding to the set data items, said set data items comprising a plurality of digits arranged as a number, and said set display labels comprising a plurality of characters;

a transparent touch panel superposed on said display means and including a plurality of touch keys, each of said touch keys corresponding to a set display label, the transparent touch panel also including an input setting key frame including a plurality of input data displays adapted to collectively display an input data item, said input data item comprising a plurality of digits arranged as a number, said input setting key frame also including at least one increment key for incrementing the digits of the input data item, and at least one decrement key for decrementing the digits of the input data item.

DETAILED DESCRIPTION OF THE PREFERRED EMBODIMENTS

Preferred embodiments of this invention will now be described with reference to FIGS. 1 and 2 in which display labels or data items similar to or identical to those shown in FIGS. 3 and 4 are designated by the same reference characters.

Figure 1:
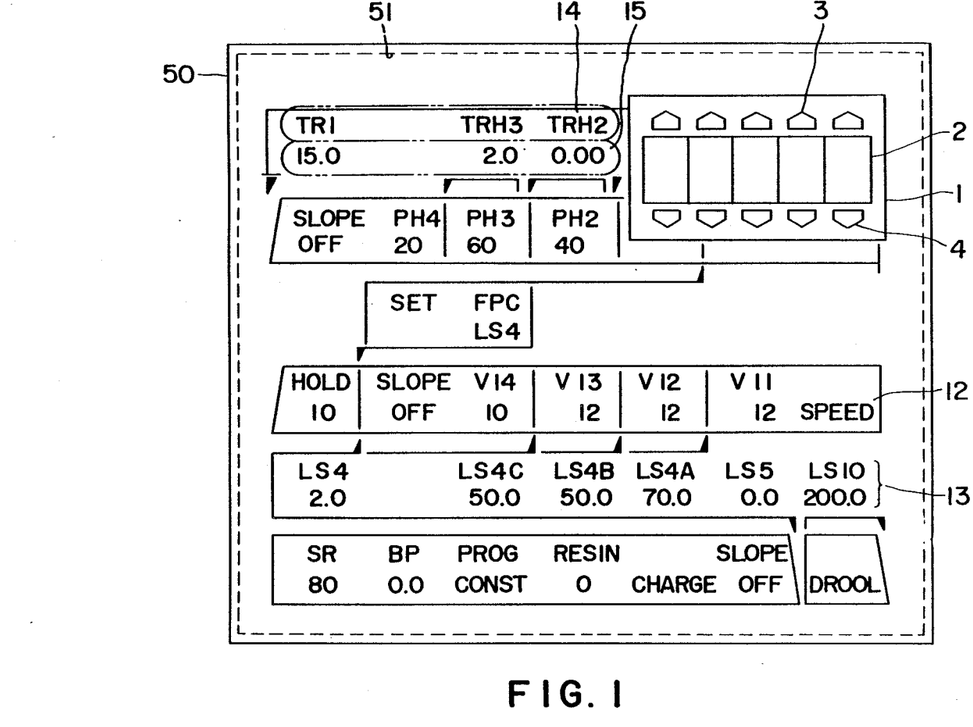
FIG. 1 is a block diagram showing a front view of the display apparatus embodying the invention.

In FIG. 1, reference numeral 1 designates an input setting key frame in which are formed a plurality of input data displays 2 each corresponding to one digit of the data item to be changed. The upper and lower sides of the input data displays 2 is provided with an increment key 3 and decrement key 4. These increment and decrement keys 3 and 4 and the touch key corresponding to set data items 15 have touch switch performance.

A method of setting data will now be described. When any one of the touch key corresponding to a set display label 14 (and representing a machine parameter to be set) is operated, a display lamp (not shown) of the selected set display label 15 is caused to flash and the input setting key frame 1 is displayed at a position on the CRT which is not also displaying the set data item selected to be changed.

At this time, the key frame displays an input data item on the input data displays 2, which is the same number as the set data item selected input setting key frame 1 display the same data as the selected set data.

When either one of the increment key 3 or the decrement key 4 corresponding to any input data display 2 in the input setting key frame 1 is operated, the input data item can be set or changed by directly increasing or decreasing the digit.

Figure 2:
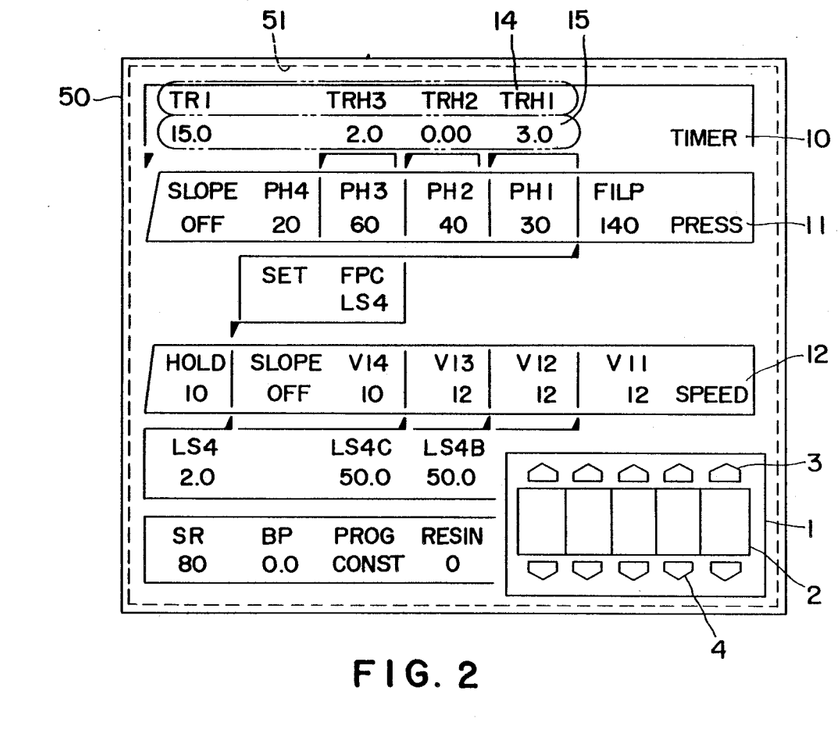
FIG. 2 is a similar view showing a modified embodiment of this invention.

In FIGS. 1 and 2, the input setting key frame 1 is shown at two different positions, so that when data items in the lower half of the face plate are selected to be changed (as in FIG. 1), the input setting key frame 1 is displayed at the upper portion of the CRT not already displaying the set data item selected for changing. When the items in the upper half are selected (as shown in FIG. 2), the input setting key frame 1 is displayed at the lower CRT portion not containing the set items selected. Thus, by displaying the input setting key frame 1 at either one of the upper and lower positions, the data of the original set data item would not be erased. Should the original data be erased its original value would be lost.

Although in FIGS. 1-4, a CRT was used as a display device, such other display devices as a plasma display device, an electroluminescent display device, and a liquid crystal display device can also be used.

Since a transparent input setting key frame is superposed on a display means. The display means can be used for displaying the set data item as it is set, thus improving the display performance.

Moreover, since the input setting key frame 1 is provided with increment and decrement keys for each digit of the input data item to be set, it is possible to readily change the set data items. This improves the efficiency of data setting and prevents erroneous setting.

Figure 5:
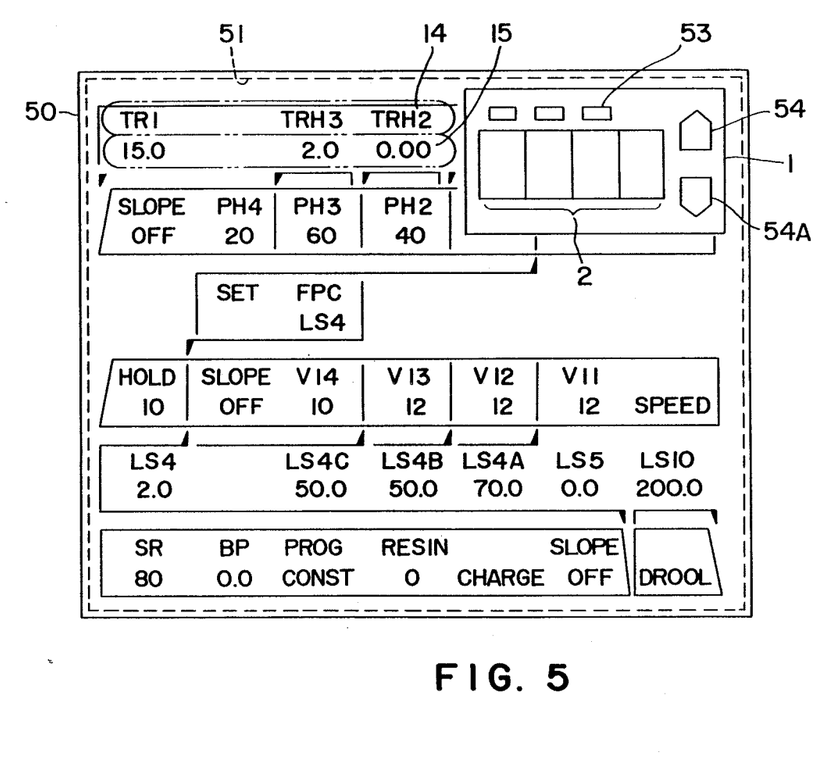
FIGS. 5 and 6 are block diagrams of front views showing other embodiments of this invention.
Figure 6:
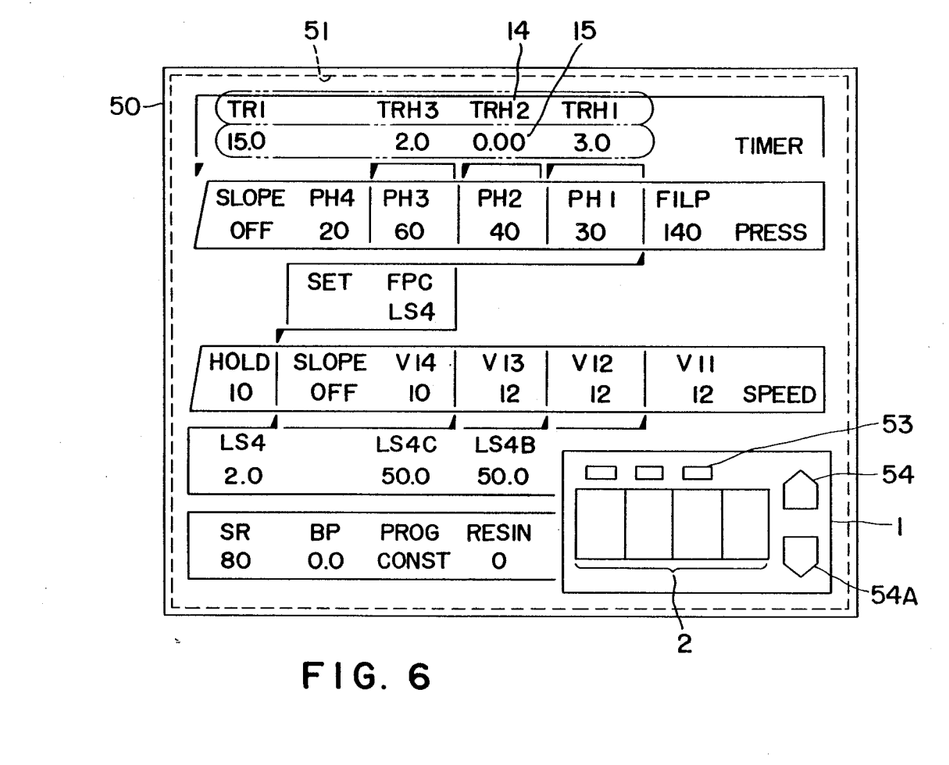

FIGS. 5 and 6 show other embodiments of this invention. The construction of the transparent touch panels shown in FIGS. 5 and 6 are similar to those shown in FIGS. 1 and 2, and only the construction and position of the input setting key frame 1 are different. The input setting key frame 1 contains input data display members 2 which correspond to each digit of the data item to be changed. A digit selection key 53 corresponds to each input data display members 2 except for the least significant digit. An increment key 54 and a decrement key 55 are disposed on one side of the input data display members 2. The increment and decrement keys 54 and 54A are used to increase and decrease the digit selected by the digit selection key 53. The keys 53, 54A and 55 may take the form of touch keys switches.

The embodiments shown in FIGS. 5 and 6 are different from each other only in that the input setting key frame 1 is displayed at different corners of the touch panel.

With the embodiments shown in FIGS. 5 and 6 the value of set data items can be directly increased or decreased by operating the increment key 54 or the decrement key 55. More particularly, any digit of the set data item can be changed by first operating one of the digit selection keys 53 and then operating the increment key 54 or the decrement key 54A. The least significant digit can be changed by merely operating the increment key 54 or the decrement key 54A without operating the digit selection key. The embodiments shown in FIGS. 5 and 6 are convenient to change the data, especially for set data items containing many digits. For example, when it is desired to change presently displayed data 210 to 220, the middle digit selection key 53 is operated, and then the increment key 54 is operated once. This operation is much simpler and faster than a case wherein the digit selection keys 53 are not used. In such a case, the increment or decrement keys must be operated ten times to accomplish the same result.

Figure 7:
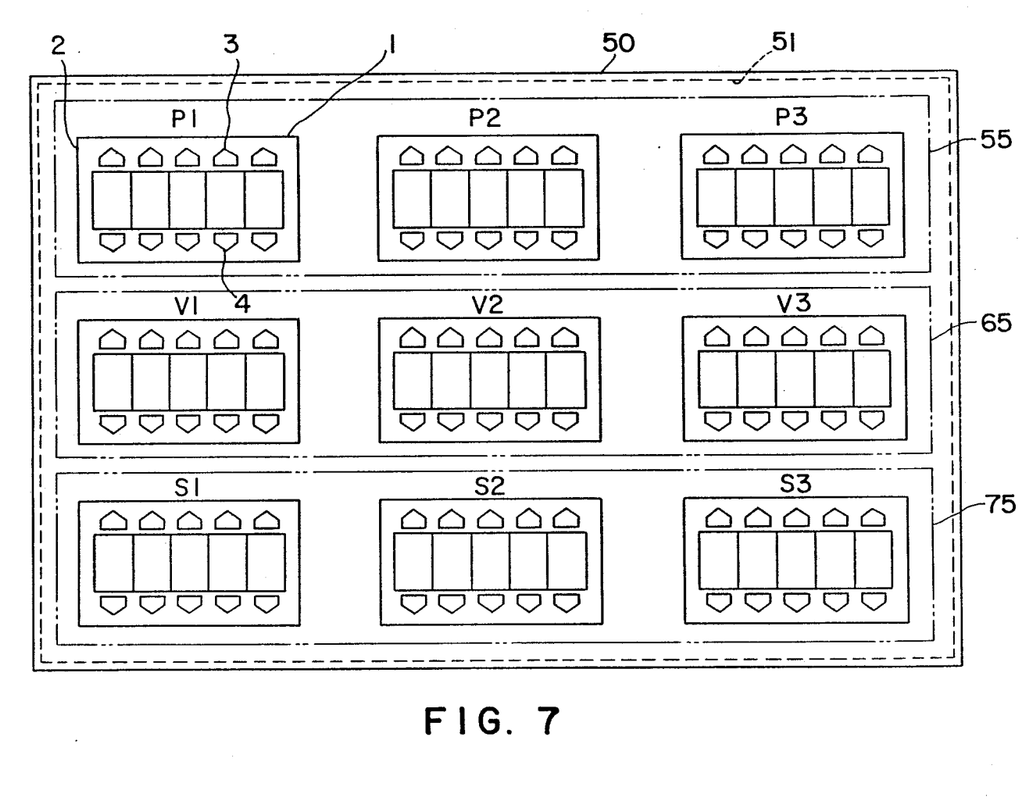
FIG. 7 is a plan view showing touch key elements for all orders of magnitude of all set items constructed in accordance with this invention, wherein each touch key is provided with an increment key and a decrement key.

FIG. 7 shows still another embodiment of this invention wherein a plurality of input setting key frames 1 are arranged in a matrix. In the embodiment shown in FIG. 7, set data items selected to be changed are the injection pressure, the injection speed and the injection speed changing position. As before, a transparent touch panel 50 is superposed on the surface of the face plate 51 of a CRT and provided with a plurality of touch keys. The uppermost row 55 bounded by dot and dash lines designates an injection pressure setter including three input setting key frames 1 each including five input data display members 2 corresponding to five digits, five increment keys 3 and five decrement keys 4 respectively disposed above and below the input data display members 2. The middle row 65 designates an injection speed setter, and the lowermost row 75 designates an injection speed change position setter. Setters 65 and 75 have the same construction. In FIG. 7 settings of injection pressure, injection speed and injection speed change position can be readily changed by merely operating the increment key 3 or decrement key 4 associated with the digit to be changed.

For this reason the display apparatus of the present invention, which displays an input setting key frame at a portion of the CRT which does not display the data item to be set, provides a significant advantage.

What is claimed is:

1. Display apparatus comprising:
   display means adapted to display a plurality of set data items and set display labels corresponding to the set data items, said set data items comprising a plurality of digits arranged as a number, and said set display labels comprising a plurality of characters;
   a transparent touch panel superposed on said display means and including a plurality of touch keys, each of said touch keys corresponding to a set display label, the transparent touch panel also including an input setting key frame including a plurality of input data displays adapted to collectively display an input data item, said input data item comprising a plurality of digits arranged as a number, said input setting key frame also including at least one increment key for incrementing the digits of the input data item, and at least one decrement key for decrementing the digits of the input data item.

2. The display apparatus according to claim 1, wherein the input data displays are juxtaposed, and said at least one increment key and decrement key comprise one increment key corresponding to each input data display and one decrement key corresponding to each input data display, the increment keys being disposed above the corresponding input data display, and the decrement key being disposed beneath the corresponding input data display.

3. The display apparatus according to claim 1, wherein a plurality of input setting key frames are arranged in a matrix on said transparent touch panel.

4. The display apparatus according to claim 1, wherein a plurality of input setting key frames are arranged in a matrix on said transparent touch panel, and said matrix is used to set an injection pressure, an injection speed and an injection speed change position of an injection compression molding machine.

5. The display apparatus according to claim 1, wherein the input setting key frame further includes a plurality of digit selection keys each digit selection key corresponding to one of the input data displays.

6. The display apparatus according to claim 2, wherein a plurality of input setting key frames are arranged in a matrix on said transparent touch panel.

7. The data display apparatus according to claim 2, wherein a plurality of input setting key frames are arranged in a matrix on said transparent touch panel, and said matrix is used to set an injection pressure, an injection speed and an injection speed change position of an injection compression molding machine.

8. A display apparatus comprising:
   display means adapted to display a plurality of set data items and set display labels corresponding to the set data items, said set data items comprising a plurality of digits arranged as a number, and said set display labels comprising a plurality of characters;
   a transparent touch panel superposed on said display means and including a plurality of touch keys, each of said touch keys corresponding to a set display label, the transparent touch panel also including an input setting key frame including a plurality of juxtaposed input data displays adapted to collectively display an input data item, said input data item comprising a plurality of digits arranged as a number, said input setting key frame also including an increment key, a decrement key, and a plurality of digit selection keys, each digit selection key corresponding to one of the input data displays and operating to select the corresponding input data display, and said increment and decrement keys respectively incrementing and decrementing the digits of the selected input data item, the increment key being disposed above the corresponding input data display, and the decrement key being disposed beneath the corresponding input data display.

9. The display apparatus according to claim 6, wherein a plurality of input setting key frames are arranged in a matrix on said transparent touch panel, and said matrix is used to set an injection pressure, an injection speed and an injection speed change position of an injection compression molding machine.

* * * * *